(12) United States Patent
Cai et al.

(10) Patent No.: US 10,989,019 B2
(45) Date of Patent: Apr. 27, 2021

(54) FULLY-ELECTRICALLY DRIVEN DOWNHOLE SAFETY VALVE

(71) Applicant: China University of Petroleum (East China), Qingdao (CN)

(72) Inventors: Baoping Cai, Qingdao (CN); Yonghong Liu, Qingdao (CN); Chuntan Gao, Qingdao (CN); Chaoyang Sheng, Qingdao (CN); Peng Liu, Qingdao (CN); Xincheng Li, Shandong (CN); Hongqi Xu, Hebei (CN); Yandong Chen, Hebei (CN); Libing Liu, Hebei (CN); Renjie Ji, Qingdao (CN); Zengkai Liu, Qingdao (CN); Rikui Zhang, Shandong (CN); Yuqian Yang, Shandong (CN); Shitang Liu, Shandong (CN); Xin Wei, Shandong (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 16/704,722

(22) Filed: Dec. 5, 2019

(65) Prior Publication Data
US 2020/0370394 A1   Nov. 26, 2020

(30) Foreign Application Priority Data
May 20, 2019   (CN) .......................... 201910422782.0

(51) Int. Cl.
*E21B 34/06*   (2006.01)
*E21B 34/16*   (2006.01)
*F16K 31/06*   (2006.01)

(52) U.S. Cl.
CPC ............ *E21B 34/066* (2013.01); *E21B 34/16* (2013.01); *F16K 31/0668* (2013.01)

(58) Field of Classification Search
CPC ..................................................... E21B 34/066
See application file for complete search history.

(56) References Cited

U.S. PATENT DOCUMENTS

| 2002/0108747 A1* | 8/2002 | Dietz ................... E21B 34/066 166/66.7 |
| 2011/0186303 A1* | 8/2011 | Scott ................... E21B 34/066 166/373 |
| 2017/0022785 A1  | 1/2017 | Girardi et al. |

FOREIGN PATENT DOCUMENTS

| CN | 102409994 | 4/2012 |
| CN | 102410271 | 4/2012 |

(Continued)

OTHER PUBLICATIONS

Cai, Baoping et al., "Development of monitoring system of subsea BOP experimental teaching platform based on LabVIEW," Experimental Technology and Management, vol. 34, No. 3, pp. 143-146, Mar. 2017.

(Continued)

*Primary Examiner* — Giovanna Wright
(74) *Attorney, Agent, or Firm* — Levine Bagade Han LLP

(57) ABSTRACT

The present disclosure belongs to the field of petroleum engineering, in particular to a fully-electrically driven downhole safety valve. The fully-electrically driven downhole safety valve comprises a downhole safety valve mechanism and a downhole safety valve control system; wherein the downhole safety valve mechanism includes an electronic cabin module, a transmission control module, a motion conversion module, a magnetic coupling and spring module, and a valve module; the downhole safety valve control system includes a downhole comprehensive unit and an uphole comprehensive unit.

5 Claims, 2 Drawing Sheets

(56) References Cited

FOREIGN PATENT DOCUMENTS

| CN | 104453782 | 3/2015 |
|---|---|---|
| CN | 105114383 | 12/2015 |
| CN | 105178898 | 12/2015 |
| EP | 2529078 | 9/2017 |
| WO | WO 2017/203290 | 11/2017 |

OTHER PUBLICATIONS

Gu, He-yuan et al., "Development of Deep-water Simulation Experimental Device for Subsea Blowout Preventer Stack Control System," China Academic Journal Electronic Publishing House, vol. 42, No. 4, pp. 1-5, 2013.

* cited by examiner

FULLY-ELECTRICALLY DRIVEN DOWNHOLE SAFETY VALVE

CROSS-REFERENCE TO RELATED APPLICATION

This present application claims priority and benefit to Chinese Patent Application No. 2019104227820, filed on May 20, 2019, entitled "Fully-electrically driven downhole safety valve", which is incorporated herein by reference in its entirety.

BACKGROUND

Technical Field

The present disclosure belongs to the field of petroleum engineering, in particular to a fully-electrically driven downhole safety valve.

Description of the Related Art

Due to the particularity of maritime safety, once a well blowout, oil spill, fire or other accident occurs, the consequences and secondary disasters are far greater than those of onshore oilfields. According to provisions of American Petroleum Institute, it is necessary to install safety control devices in oil wells and water injection wells in offshore oilfields. The downhole safety valve is an important part of a downhole safety control system. It is a device that automatically shuts off the well when a major failure occurs at the wellhead and has the effects of protecting equipments, preventing the production from being damaged, protecting the environment and preventing the pollution caused by oil and gas blowout.

The downhole safety valve systems used in offshore oilfields are all hydraulically controlled downhole safety valves and include three parts: tubing safety valve located underground, hydraulic control system on the ground, and hydraulic pipelines for connecting the two parts above. Since the hydraulically controlled downhole safety valve uses hydraulic pressure as the driving force, it has, due to the limitations of the hydraulic pressure and hydraulic pipelines themselves, the following problems that the opening and closing of the valve plate is controlled by the hydraulic pipeline, and the safety valve has a limited setting depth; it has high requirements for control fluid, and needs to works over a wide range of temperatures and pressures; and the operating procedure is complicated and the hydraulic control response time is long.

BRIEF SUMMARY

In order to overcome the deficiencies of the prior art, it is an object of the present disclosure to provide a fully-electrically driven downhole safety valve.

In order to achieve the object above, the following technical solutions are adopted.

The fully-electrically driven downhole safety valve includes a downhole safety valve mechanism and a downhole safety valve control system.

The downhole safety valve mechanism includes an electronic cabin module, a transmission control module, a motion conversion module, a magnetic coupling and spring module, and a valve module.

The electronic cabin module includes an upper tubing connection joint, an electrical connector, a downhole electronic cabin, an electronic cabin pressure-bearing cylinder and an electronic cabin wiring hole. The electrical connector is mounted on the upper tubing connection joint through screw-threads, the upper tubing connection joint and the electronic cabin pressure-bearing cylinder constitute a sealed downhole electronic cabin having an annular space through a screw-thread fit, and the electronic cabin wiring hole is left on the electronic cabin pressure-bearing cylinder.

The transmission control module includes an outer pressure-bearing cylinder, a high-torque DC motor, a single-pass stud, a motor mounting plate, a low-speed gear, a mounting bushing, a hollow gear shaft, an electromagnetic clutch, a transmission housing, a plug-in mounting pad, an electromagnetic brake, an electromagnetic brake braking pad, a connecting flange and a hollow transmission shaft. The high-torque DC motor is mounted on an annular motor mounting plate by screws, the low-speed gear is mounted on the high-torque DC motor in a flat key fit, the motor mounting plate is mounted on the mounting bushing by the single-pass stud, the mounting bushing is mounted on the transmission housing through an interference fit, a bearing is mounted on the mounting bushing, the hollow gear shaft is mounted on the mounting bushing through the bearing and an upper gear meshes with the low-speed gear, a lower end of the hollow gear shaft is mounted on the electromagnetic clutch through interference bonding, the electromagnetic clutch is mounted on the transmission housing through interference bonding, a lower end of the electromagnetic clutch is mounted on the hollow transmission shaft through interference bonding, an annular connecting flange is mounted on the hollow transmission shaft through a pin shaft, the connecting flange and an annular electromagnetic brake braking pad are fixed by bolts, the electromagnetic brake is fixed on the transmission housing with the plug-in mounting pad through screws, and the hollow transmission shaft forms a bearing fit with the transmission housing through the bearing.

The motion conversion module includes a torque limiter, an upper bearing joint, an inner pressure-bearing cylinder, thin-walled bearings, a screw mounting cylinder, an embedded ball screw slider, an embedded ball screw and a lower bearing joint. The torque limiter is mounted in the embedded ball screw through screws, the embedded ball screw forms a bearing fit with the screw mounting cylinder through two thin-walled bearings, the embedded ball screw forms a threaded pair fit with the embedded ball screw slider and the embedded ball screw slider is located inside the embedded ball screw, and a spline groove formed in the embedded ball screw slider and a spline shaft on the inner pressure-bearing cylinder form a spline fit.

The magnetic coupling and spring module includes an outer magnetically coupled cylinder, a flow pipe cap, outer magnetic rings, outer gaskets, inner magnetic rings, inner gaskets, an inner magnetically coupled flow pipe and a spring. The outer magnetically coupled cylinder is molded by welding two rings and a cylinder, the outer magnetic rings and the outer gaskets are disposed inside the outer magnetically coupled cylinder, one outer magnetic ring and several outer gaskets constitute one outer magnetically coupled unit, several outer magnetically coupled units constitute an outer magnetically coupled device, the inner magnetic rings and inner gaskets of the same numbers as the outer magnetic rings and outer gaskets inside the outer magnetically coupled cylinder are mounted on the inner magnetically coupled flow pipe, the outer and inner magnetic rings and the outer and inner gaskets are in one-to-one correspondence, the inner and outer magnetic rings have the same or different magnetic poles and constitute an inner magnetically coupled device; the flow pipe cap is mounted on a top end of the inner magnetically coupled flow pipe by screw-threads, and annular rings protruding from upper and lower portions of the outer magnetically coupled cylinder form a clearance fit with the inner pressure-bearing cylinder; the flow pipe cap and the inner magnetically coupled flow pipe form a clearance fit with the inner pressure-bearing cylinder, and the spring is disposed at a lower end of the outer magnetically coupled cylinder.

The valve module includes a valve seat joint, a self-balancing valve seat, an action valve plate, a valve plate torsion spring, an action sensor, and a lower tubing connection joint. The self-balancing valve seat is mounted on the valve seat joint through screw-threads, the action valve plate is mounted on the self-balancing valve seat, the valve plate torsion spring is mounted between the action valve plate and the self-balancing valve seat, the action sensor is mounted on the self-balancing valve seat, and the lower tubing connection joint is mounted on the valve seat joint through screw-threads.

The electronic cabin module is fitted with threads at an upper end of the outer pressure-bearing cylinder of the transmission control module through threads at a lower end of the upper tubing connection joint of the electronic cabin module, and is also fitted with threads at an upper end of the inner pressure-bearing cylinder of the motion conversion module through threads at a lower end of the electronic cabin pressure-bearing cylinder of the electronic cabin module; the transmission control module is fitted with threads at an upper end of the upper bearing joint of the motion conversion module through threads at a lower end of the outer pressure-bearing cylinder of the transmission control module, is mounted with a through-hole at the upper end of the upper bearing joint of the motion conversion module by screws via a threaded hole at a lower end of the transmission housing of the transmission control module, and is mounted in a shaft sleeve of the torque limiter of the motion conversion module through a lower end of the hollow transmission shaft of the transmission control module; the motion conversion module is mounted in external threads at an upper end of the valve seat joint of the valve module through threads at a lower end of the lower bearing joint of the motion conversion module, and is also mounted in internal threads at the upper end of the valve seat joint of the valve module through threads at a lower end of the inner pressure-bearing cylinder of the motion conversion module; and the magnetic coupling and spring module is mounted in a threaded hole at a lower end of the embedded ball screw slider of the motion conversion module by screws via a through-hole at an upper end of the outer magnetically coupled cylinder of the magnetic coupling and spring module, and acts on the upper end surface of the valve seat joint of the valve module through the spring of the magnetic coupling and spring module.

The downhole safety valve control system includes a downhole comprehensive unit and an uphole comprehensive unit. The downhole comprehensive unit includes an information receiving module, a motor relay, an electromagnetic clutch relay, an electromagnetic brake relay, a downhole control and information processing module, a downhole power carrier module, and a power receiving module. The uphole comprehensive unit includes an uphole power carrier module, an uphole control and information processing module, a power transmission module, and a status display module.

Compared with the prior art, the present disclosure has the beneficial effects that through the fully-electrically driven safety valve, the response speed of the safety valve in an emergency situation can be greatly improved; since the moving parts of the fully-electrically driven safety valve are all mounted in the sealed cabin, the working conditions are improved and the equipment operates more reliably; by the magnetically coupled device, the well fluid pressure is isolated, the power source is electric power and the limitation to the penetration depth is small, while the cost of the system is reduced without the hydraulic power unit and hydraulic pipelines.

| Description of the reference numbers | |
| --- | --- |
| A electronic cabin module | B transmission control module |
| C motion conversion module | D magnetic coupling and spring module |
| E valve module | 1 upper tubing connection joint |
| 2 electrical connector | 3 downhole electronic cabin |
| 4 electronic cabin pressure-bearing cylinder | 5 electronic cabin wiring hole |
| 6 external pressure-bearing cylinder | 7 high-torque DC motor |
| 8 single-pass stud | 9 motor mounting plate |
| 10 low-speed gear | 11 mounting bushing |
| 12 hollow gear shaft | 13 electromagnetic clutch |
| 14 transmission housing | 15 plug-in mounting pad |
| 16 electromagnetic brake | 17 electromagnetic brake braking pad |
| 18 connecting flange | 19 hollow transmission shaft |
| 20 torque limiter | 21 upper bearing joint |
| 22 inner pressure-bearing cylinder | 23 thin-walled bearings |
| 24 screw mounting cylinder | 25 embedded ball screw slider |
| 26 embedded ball screw | 27 external magnetically coupled cylinder |
| 28 flow pipe cap | 29 outer magnetic ring |
| 30 outer gasket | 31 inner magnetic ring |
| 32 inner gasket | 33 internal magnetically coupled flow pipe |
| 34 lower bearing joint | 35 spring |
| 36 valve seat joint | 37 self-balancing valve seat |
| 38 action valve plate | 39 valve plate torsion spring |
| 40 action sensor | 41 lower tubing connection joint |
| 42 information receiving module | 43 motor relay |
| 44 electromagnetic clutch relay | 45 electromagnetic brake relay |
| 46 downhole control and information processing module | 47 power receiving module |
| 48 downhole power carrier module | 49 downhole comprehensive unit |
| 50 uphole power carrier module | 51 uphole control and information processing module |
| 52 power transmission module | 53 status display module |
| 54 uphole comprehensive unit | 55 downhole safety valve control system |
| 121 upper gear | |

DETAILED DESCRIPTION

Figure 1:
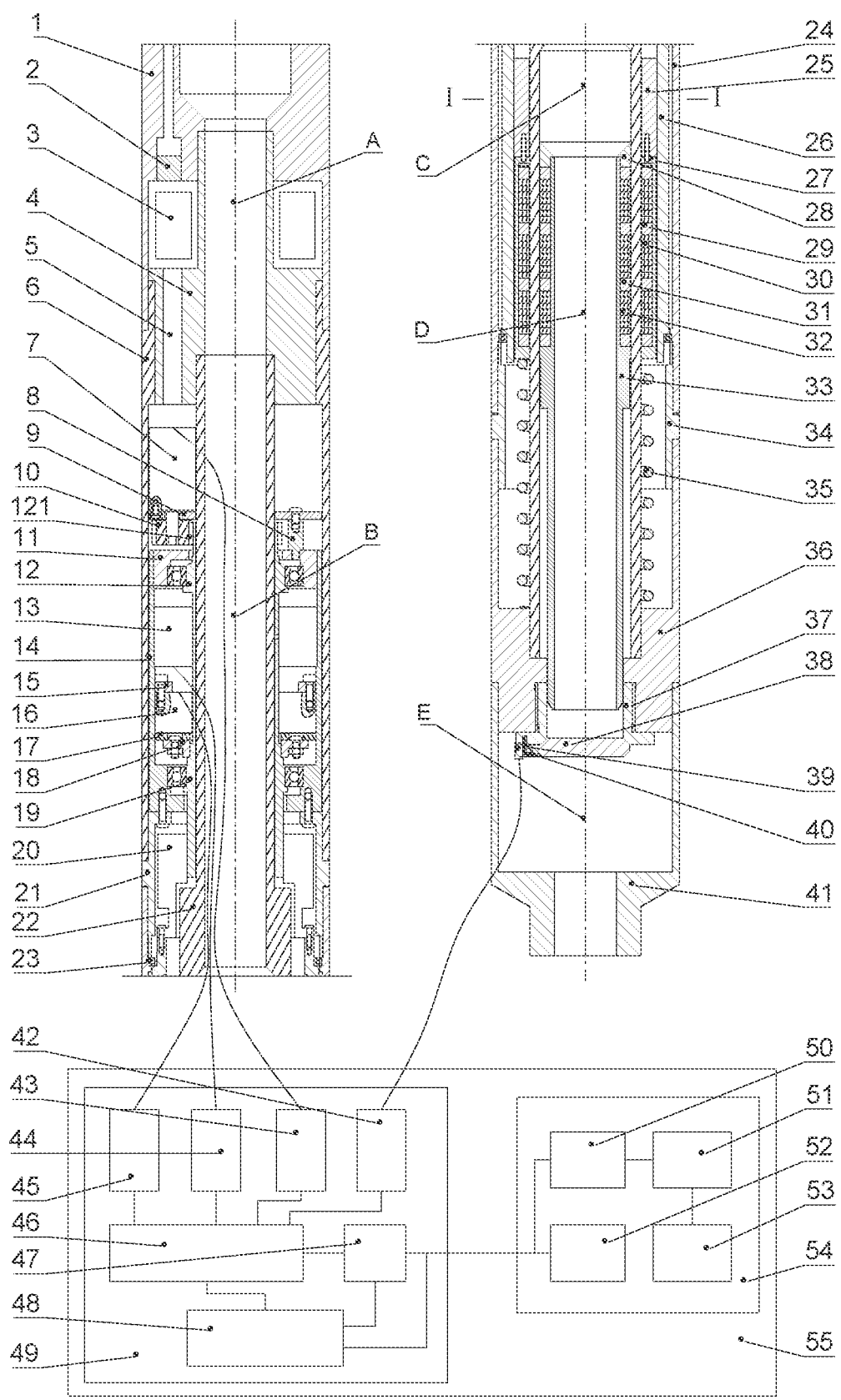
FIG. 1 is a schematic axial sectional view of a fully-electrically driven downhole safety valve and a schematic diagram of a control system.
Figure 2:
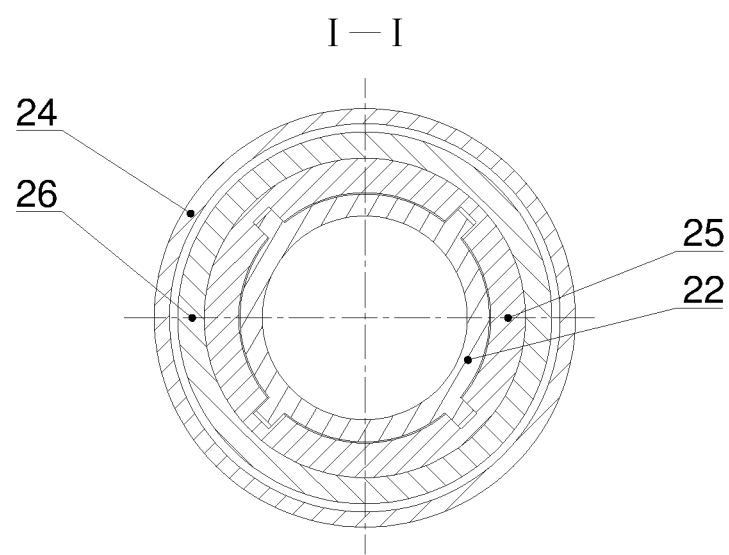
FIG. 2 is a cross-sectional view showing the cross section of the I-I.

As shown in FIGS. 1 and 2, a fully-electrically driven downhole safety valve includes a downhole safety valve mechanism and a downhole safety valve control system 55.

The downhole safety valve mechanism includes an electronic cabin module A, a transmission control module B, a motion conversion module C, a magnetic coupling and spring module D and a valve module E.

The electronic cabin module A includes an upper tubing connection joint 1, an electrical connector 2, a downhole electronic cabin 3, an electronic cabin pressure-bearing cylinder 4 and an electronic cabin wiring hole 5. The electrical connector 2 is mounted on the upper tubing connection joint 1 through screw-threads, for installing cables; the upper tubing connection joint 1 and the electronic cabin pressure-bearing cylinder 4 constitute a sealed downhole electronic cabin 3 having an annular space through a screw-thread fit, for installing the downhole comprehensive unit 49; and the electronic cabin wiring hole 5 is left on the electronic cabin pressure-bearing cylinder 4 for routing.

The transmission control module B includes an outer pressure-bearing cylinder 6, a high-torque DC motor 7, a single-pass stud 8, a motor mounting plate 9, a low-speed gear 10, a mounting bushing 11, a hollow gear shaft 12, an electromagnetic clutch 13, a transmission housing 14, a plug-in mounting pad 15, an electromagnetic brake 16, an electromagnetic brake braking pad 17, a connection flange 18 and a hollow transmission shaft 19. The high-torque DC motor 7 is mounted on the annular motor mounting plate 9 by screws for driving, the low-speed gear 10 is mounted on the high-torque DC motor 7 in a flat key fit for transmission; the motor mounting plate 9 is mounted on the mounting bushing 11 by the single-pass stud 8, the mounting bushing 11 is mounted on the transmission housing 14 through an interference fit, a bearing is mounted on the mounting bushing 11, the hollow gear shaft 12 is mounted on the mounting bushing 11 through the bearing and an upper gear 121 meshes with the low-speed gear 10 for transmission; the lower end of the hollow gear shaft 12 is mounted on the electromagnetic clutch 13 through interference bonding, the electromagnetic clutch 13 is mounted on the transmission housing 14 through interference bonding, the lower end of the electromagnetic clutch 13 is mounted on the hollow transmission shaft 19 through interference bonding, the electromagnetic clutch 13 is used for controlling the synchronous rotational relation between the hollow gear shaft 12 and the hollow transmission shaft 19; the annular connecting flange 18 is mounted on the hollow transmission shaft 19 through a pin shaft, the connecting flange 18 and the annular electromagnetic brake braking pad 17 are fixed by bolts, the electromagnetic brake 16 is fixed on the transmission housing 14 with the plug-in mounting pad 15 through screws and is used for controlling the rotational motion of the hollow transmission shaft 19; and the hollow transmission shaft 19 forms a bearing fit with the transmission housing 14 through the bearing, thereby ensuring the rotational motion thereof.

The motion conversion module C includes a torque limiter 20, an upper bearing joint 21, an inner pressure-bearing cylinder 22, thin-walled bearings 23, a screw mounting cylinder 24, an embedded ball screw slider 25, an embedded ball screw 26 and a lower bearing joint 34. The torque limiter 20 is mounted in the embedded ball screw 26 through screws and is used for disconnecting the synchronous rotational relation between the hollow transmission shaft 19 and the embedded ball screw 26 during torque overload, reducing the output torque of the high-torque DC motor 7, and preventing the high-torque DC motor 7 from being burnt due to overload; the embedded ball screw 26 forms a bearing fit with the screw mounting cylinder 24 through two thin-walled bearings 23, the embedded ball screw 26 forms a threaded pair fit with the embedded ball screw slider 25 and the embedded ball screw slider 25 is located inside the embedded ball screw 26, for converting between the rotational motion of the embedded ball screw 26 and the linear motion of the embedded ball screw slider 25, and a spline groove formed in the embedded ball screw slider 25 and a spline shaft on the inner pressure-bearing cylinder 26 form a spline fit, for ensuring that the embedded ball screw slider 25 always do linear motion.

The magnetic coupling and spring module D includes an outer magnetically coupled cylinder 27, a flow pipe cap 28, outer magnetic rings 29, outer gaskets 30, inner magnetic rings 31, inner gaskets 32, an inner magnetically coupled flow pipe 33 and a spring 35. The outer magnetically coupled cylinder 27 is molded by welding two rings and a cylinder, the outer magnetic rings 29 and the outer gaskets 30 are disposed inside the outer magnetically coupled cylinder 27, one outer magnetic ring 29 and several outer gaskets 30 constitute one outer magnetically coupled unit, several outer magnetically coupled units constitute an outer magnetically coupled device, the inner magnetic rings 31 and inner gaskets 32 of the same numbers as the outer magnetic rings and outer gaskets inside the outer magnetically coupled cylinder 27 are mounted on the inner magnetically coupled flow pipe 33, the outer and inner magnetic rings and the outer and inner gaskets are in one-to-one correspondence, the inner and outer magnetic rings have the same or different magnetic poles and constitute an inner magnetically coupled device; the flow pipe cap 28 is mounted on the top end of the inner magnetically coupled flow pipe 33 by screw-threads for tightly pressing the inner magnetically coupled device, the inner and outer magnetically coupled devices are used for realizing the contactless transmission of the axial force; annular rings protruding from the upper and lower portions of the outer magnetically coupled cylinder 27 forms a clearance fit with the inner pressure-bearing cylinder 22, the flow pipe cap 28, the inner magnetically coupled flow pipe 33 forms a clearance fit with the inner pressure-bearing cylinder 22, for ensuring the neutrality of transmitting the axial force and that the inner and outer magnetically coupled devices are not rubbed against the inner pressure-bearing cylinder 22; and the spring 35 is disposed at the lower end of the outer magnetically coupled cylinder 27, for ensuring the closing and failure safety protection of the safety valve.

The valve module E includes a valve seat joint 36, a self-balancing valve seat 37, an action valve plate 38, a valve plate torsion spring 39, an action sensor 40, and a lower tubing connection joint 41. The self-balancing valve seat 37 is mounted on the valve seat joint 36 through screw-threads, the action valve plate 38 is mounted on the self-balancing valve seat 37, the valve plate torsion spring 39 is mounted between the action valve plate 38 and the self-balancing valve seat 37 for closing the action valve plate 38 and the flow path, the action sensor 40 is mounted on the self-balancing valve seat 37 for detecting the action information of the action valve plate 38, and the lower tubing connection joint 41 is mounted on the valve seat joint 36 through screw-threads.

The electronic cabin module A is fitted with threads at the upper end of the outer pressure-bearing cylinder 6 of the transmission control module B through threads at the lower end of its upper tubing connection joint 1, and is also fitted with threads at the upper end of the inner pressure-bearing cylinder 22 of the motion conversion module C through threads at the lower end of its electronic cabin pressure-bearing cylinder 4; the transmission control module B is fitted with threads at the upper end of the upper bearing joint 21 of the motion conversion module C through threads at the lower end of its outer pressure-bearing cylinder 6, is mounted with a through-hole at the upper end of the upper bearing joint 21 of the motion conversion module C by screws via a threaded hole at the lower end of its transmission housing 14, and is mounted in a shaft sleeve of the torque limiter 20 of the motion conversion module C through the lower end of its hollow transmission shaft 19; the motion conversion module C is mounted in external threads at the upper end of the valve seat joint 36 of the valve module E through threads at the lower end of its lower bearing joint 34, and is also mounted in internal threads at the upper end of the valve seat joint 36 of the valve module E through threads at the lower end of its inner pressure-bearing cylinder 22; and the magnetic coupling and spring module D is mounted in a threaded hole at the lower end of the embedded ball screw slider 25 of the motion conversion module C by screws via a through-hole at the upper end of its outer magnetically coupled cylinder 27, and acts on the upper end surface of the valve seat joint 36 of the valve module E through its spring 35.

The downhole safety valve control system 55 includes a downhole comprehensive unit 49 and an uphole comprehensive unit 54, which are connected by a power line. The downhole comprehensive unit 49 includes an information receiving module 42, a motor relay 43, an electromagnetic clutch relay 44, an electromagnetic brake relay 45, a downhole control and information processing module 46, a downhole power carrier module 48, and a power receiving module 47. The information receiving module 42 receives information from the action sensor 40 through a cable and transmits it to the downhole control and information processing module 46 through a cable. The motor relay 43 is respectively connected to the motor 7 and the downhole control and information processing module 46 through cables, for controlling the operating state of the high-torque DC motor 7. The electromagnetic clutch relay 44 is respectively connected to the electromagnetic clutch 13 and the downhole control and information processing module 46 through cables, for controlling the operating state of the electromagnetic clutch 13. The electromagnetic brake relay 45 is respectively connected to the electromagnetic brake 16 and the downhole control and information processing module 46 through cables, for controlling the operating state of the electromagnetic brake 16. The downhole control and information processing module 46 is developed using a single chip microcomputer, and is connected to the downhole power carrier module 48 through a cable for processing information and issuing control commands. The downhole power carrier module 48 is developed using the MAX2991 and MAX2992 carrier chips, and is connected to the front end of the power receiving module 47 and the downhole control and information processing module 46 through cables for receiving the power carrier signals and processing and then transmitting them to the downhole control and information processing module 46. The power receiving module 47 is connected to the downhole power carrier module 48 and the downhole control and information processing module 46 through cables for receiving power and supplying power to other downhole electrical equipments.

The uphole comprehensive unit 54 includes an uphole power carrier module 50, an uphole control and information processing module 51, a power transmission module 52, and a status display module 53. The uphole power carrier module 50 is developed using the MAX2991 and MAX2992 carrier chips, and is connected to the front end of the power transmission module 52 and the uphole control and information processing module 51 through cables for transmitting power carrier signals to downhole and communicating with the uphole control and information processing module 51. The uphole control and information processing module 51 is developed using a single chip microcomputer, and is connected to the uphole power carrier module 50 and the status display module 53 through cables for issuing control commands and processing status information. The power transmitting module 52 is connected to the power receiving module 47 through a cable for transmitting electrical energy to downhole. The status display module 53 is connected to the uphole control and information processing module 51 through a cable for real-time display of operational status information of the downhole safety valve.

The operation process of the fully-electrically driven downhole safety valve is as follows: when the action valve plate 38 will be opening, the uphole control and information processing module 51 issues a command, and the uphole power carrier module 50 sends the command along the power line to the downhole power carrier module 48, after receiving the command, the downhole control and information processing module 46 controls the motor relay 43 and the electromagnetic clutch relay 44 to energize the high-torque DC motor 7 and the electromagnetic clutch 13, and then the high-torque DC motor 7 rotates and transmits the rotation to the electromagnetic clutch 13 through the low-speed gear 10 and the hollow gear shaft 12; the electromagnetic clutch 13 transmits the rotational motion to the hollow transmission shaft 19 in an energized state, and the hollow transmission shaft 19 drives the embedded ball screw 26 to rotate through the torque limiter 20, and the rotational motion is converted into a linear motion through the screw pair, the embedded ball screw slider 25 moves downwards to push the outer magnetically coupled cylinder 27 to move, thereby compressing the spring 35, and at the same time, due to the coupling action of the inner and outer magnetic rings, the inner magnetically coupled flow pipe 33 moves downward under the action of the inner magnetic rings 31 to eject the action valve plate 38 to complete the opening process. If the motion of the action valve plate 38 is blocked, the output torque of the high-torque DC motor 7 is increased; when the output torque exceeds a certain value, the torque limiter 20 disengages the synchronous movement of the hollow transmission shaft 19 and the embedded ball screw 26 to prevent the high-torque DC motor 7 from being burned out due to the overload.

When the action valve plate 38 is fully opened, the action sensor 40 issues signals and sends them to the downhole control and information processing module 46 through the information receiving module 42. The downhole control and information processing module 46 then controls the motor relay 43 and the electromagnetic clutch relay 44 to disconnect the power supply of the high-torque DC motor 7 and the electromagnetic clutch 13 and simultaneously controls the electromagnetic brake relay 45 to supply power to the electromagnetic brake 16; the electromagnetic brake 16 attracts the electromagnetic brake braking pad 17 and locks the hollow transmission shaft 19 to maintain the opening state of the action valve plate 38.

When it is necessary to close the safety valve in an emergency, the uphole control and information processing module 51 issues a command, the uphole power carrier module 50 sends the command along the power line to the downhole power carrier module 48, and after receiving the command, the downhole control and information processing module 46 controls the electromagnetic brake relay 45 to disconnect the power supply of the electromagnetic brake 16 to release the brake, the spring 35 resets and pushes the outer magnetically coupled cylinder 27 and the embedded ball screw slider 25 to move upward, the embedded ball screw 26 rotates under the pushing of the embedded ball screw slider 25 to drive the torque limiter 20 and the hollow transmission shaft 19 to rotate. At this time, the electromagnetic clutch 13 is powered off and does not deliver the motion, and the inner magnetically coupled flow pipe 33 follows the outer magnetically coupled cylinder 27 to move upward under the action of the magnetically coupled force, and after the embedded ball screw slider 25 resets, the action valve plate 38 completes the closing process. During the opening, opening-maintaining, and closing of the action valve plate 38, the action sensor 40 transmits the states of the action valve plate 38 to the status display module 53 for display.

Finally, it should be noted that the embodiments above are only used to illustrate the technical solutions of the present disclosure, and are not limited thereto; although the present disclosure has been described in detail with reference to the foregoing embodiments, it should be understood by a person skilled in the art that the modifications can be made to the technical solutions described in the foregoing embodiments or equivalent replacements can be made to a part of the technical features therein. These modifications and equivalent replacements fail to cause the nature of the corresponding technical solutions to depart from the spirit and scope of the technical solutions of the various embodiments of the present disclosure.

The invention claimed is:

1. A fully-electrically driven downhole safety valve, comprising:
 a downhole safety valve mechanism and a downhole safety valve control system; wherein the downhole safety valve mechanism includes an electronic cabin module, a transmission control module, a motion conversion module, a magnetic coupling and spring module, and a valve module;
 the transmission control module includes an outer pressure-bearing cylinder, a high-torque DC motor, a single-pass stud, a motor mounting plate, a low-speed gear, a mounting bushing, a hollow gear shaft, an electromagnetic clutch, a transmission housing, a plug-in mounting pad, an electromagnetic brake, an electromagnetic brake braking pad, a connecting flange and a hollow transmission shaft; the high-torque DC motor is mounted on an annular motor mounting plate by screws, the low-speed gear is mounted on the high-torque DC motor in a flat key fit, the motor mounting plate is mounted on the mounting bushing by the single-pass stud, the mounting bushing is mounted on the transmission housing through an interference fit, a bearing is mounted on the mounting bushing, the hollow gear shaft is mounted on the mounting bushing through the bearing and an upper gear meshes with the low-speed gear, a lower end of the hollow gear shaft is mounted on the electromagnetic clutch through interference bonding, the electromagnetic clutch is mounted on the transmission housing through interference bonding, a lower end of the electromagnetic clutch is mounted on the hollow transmission shaft through interference bonding, an annular connecting flange is mounted on the hollow transmission shaft through a pin shaft, the connecting flange and an annular electromagnetic brake braking pad are fixed by bolts, the electromagnetic brake is fixed on the transmission housing with the plug-in mounting pad through screws, and the hollow transmission shaft forms a bearing fit with the transmission housing through the bearing;
 the motion conversion module includes a torque limiter, an upper bearing joint, an inner pressure-bearing cylinder, thin-walled bearings, a screw mounting cylinder, an embedded ball screw slider, an embedded ball screw and a lower bearing joint; the torque limiter is mounted in the embedded ball screw through screws, the embedded ball screw forms a bearing fit with the screw mounting cylinder through two thin-walled bearings, the embedded ball screw forms a threaded pair fit with the embedded ball screw slider and the embedded ball screw slider is located inside the embedded ball screw, and a spline groove formed in the embedded ball screw slider and a spline shaft on the inner pressure-bearing cylinder form a spline fit;
 the magnetic coupling and spring module includes an outer magnetically coupled cylinder, a flow pipe cap, outer magnetic rings, outer gaskets, inner magnetic rings, inner gaskets, an inner magnetically coupled flow pipe and a spring; the outer magnetically coupled cylinder is molded by welding two rings and a cylinder, the outer magnetic rings and the outer gaskets are disposed inside the outer magnetically coupled cylinder, one outer magnetic ring and several outer gaskets constitute one outer magnetically coupled unit, several outer magnetically coupled units constitute an outer magnetically coupled device, the inner magnetic rings and inner gaskets of the same numbers as the outer magnetic rings and outer gaskets inside the outer magnetically coupled cylinder are mounted on the inner magnetically coupled flow pipe, the outer and inner magnetic rings and the outer and inner gaskets are in one-to-one correspondence, the inner and outer magnetic rings have the same or different magnetic poles and constitute an inner magnetically coupled device; the flow pipe cap is mounted on a top end of the inner magnetically coupled flow pipe by screw-threads, and annular rings protruding from upper and lower portions of the outer magnetically coupled cylinder form a clearance fit with the inner pressure-bearing cylinder; the flow pipe cap and the inner magnetically coupled flow pipe form a clearance fit with the inner pressure-bearing cylinder, and the spring is disposed at a lower end of the outer magnetically coupled cylinder;
 the downhole safety valve control system includes a downhole comprehensive unit and an uphole comprehensive unit, which are connected by a power line; wherein the downhole comprehensive unit includes an information receiving module, a motor relay, an electromagnetic clutch relay, an electromagnetic brake relay, a downhole control and information processing module, a downhole power carrier module, and a power receiving module; the motor relay is connected to the high-torque DC motor and the downhole control and information processing module through cables, respectively; the electromagnetic clutch relay is connected to the electromagnetic clutch and the downhole control and information processing module through cables, respectively; the electromagnetic brake relay is connected to the electromagnetic brake and the downhole control and information processing module through cables, respectively; and the uphole comprehensive unit includes an uphole power carrier module, an uphole control and information processing module, a power transmission module, and a status display module.

2. The fully-electrically driven downhole safety valve of claim 1, wherein the electronic cabin module includes an upper tubing connection joint, an electrical connector, a downhole electronic cabin, an electronic cabin pressure-bearing cylinder and an electronic cabin wiring hole, and the upper tubing connection joint and the electronic cabin pressure-bearing cylinder constitute a sealed downhole electronic cabin having an annular space through a screw-thread fit, the electronic cabin module is fitted with threads at an upper end of the outer pressure-bearing cylinder of the transmission control module through threads at a lower end of the upper tubing connection joint of the electronic cabin module, and is also fitted with threads at an upper end of the inner pressure-bearing cylinder of the motion conversion module through threads at a lower end of the electronic cabin pressure-bearing cylinder of the electronic cabin module.

3. The fully-electrically driven downhole safety valve of claim 1, wherein the transmission control module is fitted with threads at an upper end of the upper bearing joint of the motion conversion module through threads at a lower end of the outer pressure-bearing cylinder of the transmission control module, is mounted with a through-hole at the upper end of the upper bearing joint of the motion conversion module by screws via a threaded hole at a lower end of the transmission housing of the transmission control module, and is mounted in a shaft sleeve of the torque limiter of the motion conversion module through a lower end of the hollow transmission shaft of the transmission control module.

4. The fully-electrically driven downhole safety valve of claim 1, wherein the motion conversion module is mounted in external threads at an upper end of a valve seat joint of the valve module through threads at a lower end of the lower bearing joint of the motion conversion module, and is also mounted in internal threads at the upper end of the valve seat joint of the valve module through threads at a lower end of the inner pressure-bearing cylinder of the motion conversion module; and the magnetic coupling and spring module is mounted in a threaded hole at a lower end of the embedded ball screw slider of the motion conversion module by screws via a through-hole at an upper end of the outer magnetically coupled cylinder of the magnetic coupling and spring module, and acts on the upper end surface of the valve seat joint of the valve module through the spring of the magnetic coupling and spring module.

5. The fully-electrically driven downhole safety valve of claim 1, wherein the downhole power carrier module is developed using carrier chips, and is connected to a front end of the power receiving module and the downhole control and information processing module through cables; and the uphole power carrier module is developed using carrier chips, and is connected to a front end of the power transmission module and the uphole control and information processing module through cables.

* * * * *